United States Patent [19]
Michel-Kim

[11] Patent Number: 5,089,030
[45] Date of Patent: Feb. 18, 1992

[54] APPARATUS FOR PRODUCING GENERATOR GAS AND ACTIVATED CARBON FROM SOLID FUELS

[76] Inventor: Herwig Michel-Kim, Bamberger Strasse 41, D-1000 Berlin 30, Fed. Rep. of Germany

[21] Appl. No.: 588,605

[22] Filed: Sep. 26, 1990

Related U.S. Application Data

[62] Division of Ser. No. 248,808, Sep. 23, 1988, Pat. No. 4,987,115.

[30] Foreign Application Priority Data

Sep. 25, 1987 [DE]  Fed. Rep. of Germany ....... 3732867

[51] Int. Cl.⁵ .............................................. C10J 3/20
[52] U.S. Cl. .......................................... 48/76; 48/63; 48/66; 48/85.1; 48/85.2; 48/86 A; 48/111; 422/156
[58] Field of Search .................. 502/419.44, 431, 433, 502/435; 423/415 A, 449; 201/35; 202/113, 115, 116; 110/229, 208, 209, 248, 255, 257; 48/203, 197 R, 63, 76, 66, 68, 77, 85.1, 85.2, 111, 86 A; 422/156

[56] References Cited

U.S. PATENT DOCUMENTS

| | | | |
|---|---|---|---|
| 1,866,730 | 7/1932 | Sperr | 48/86 A |
| 1,888,586 | 11/1932 | Chapman | 48/81 D |
| 2,099,968 | 11/1937 | Szikla et al. | 48/76 |
| 2,280,611 | 4/1942 | Adler | 252/291 |
| 4,417,528 | 11/1983 | Vining et al. | 48/77 |
| 4,764,185 | 8/1988 | Mayer | 48/76 |
| 4,971,599 | 11/1990 | Cordell | 48/76 |

FOREIGN PATENT DOCUMENTS

| | | |
|---|---|---|
| 50137 | 3/1889 | Fed. Rep. of Germany . |
| 3335544 | 4/1985 | Fed. Rep. of Germany . |
| 8704453 | 7/1987 | PCT Int'l Appl. . |

OTHER PUBLICATIONS

Mark's Standard Handbook for Mechanical Engineers, Eighth Edition, pp. 4-57 and 7-41-7-42.
Basic Organic Chemistry; Part 5: Industrial Products, 1975; John Wiley & Sons; p. 23.

*Primary Examiner*—Peter Kratz
*Attorney, Agent, or Firm*—Basile and Hanlon

[57] ABSTRACT

A method and an apparatus for producing generator gas and activated carbon from solid fuels. A first gasification stage is supplied with fuel by an underfeed charging system and preheated air, the air and fuel being supplied in the same direction. In a second gasification stage and accompanied by the supply of secondary air, an intermediate gasification takes place. Finally, in a third gasification stage, the gas is reacted with glowing coke or charcoal, and the heat of the exiting gas is used for heating the air. The fuel centrally entering the first gasification stage is led from the inside to the outside and then upwards. Part of the entering fuel is precombusted in a precombustion chamber linked with the supply of the preheated air for reducing the oxygen content of the preheated air. In the intermediate gasification stage, the gas with the admixed air is passed through a Venturi nozzle or tube with a diffuser. The flue coal entrained from the first gasification stage is at least partly returned to the throat of the Venturi tube. The return is assisted both by vacuum in the Venturi tube and mechanically.

16 Claims, 4 Drawing Sheets

APPARATUS FOR PRODUCING GENERATOR GAS AND ACTIVATED CARBON FROM SOLID FUELS

CROSS-REFERENCE TO RELATED APPLICATION

This application is a divisional application of U.S. Ser. No. 07/248,808 filed Sept. 23, 1988 for METHOD FOR PRODUCING GENERATOR GAS AND ACTIVATED CARBON FROM SOLID FUELS now U.S. Pat. No. 4,987,115.

BACKGROUND OF THE INVENTION

1. Field of the Invention

The invention relates to a method for producing generator gas and activated carbon from solid fuels, as well as to an apparatus for performing the method.

2. Description of the Relevant Art

German Laid-Open Patent No. 33 35 544 discloses a reactor means for producing lean or generator gas from biomasses or other carbonizable by-products. It has a primary gasifier and a series-connected secondary gasifier, to each of which air is supplied. A flue flow gas converter is provided between the primary gasifier and the secondary gasifier. An intermediate gasification takes place in the gas converter. The fuel is supplied proportionally by means of an underfeed charging system, and the gasification air is introduced through a ring nozzle or a central nozzle in a rotationally symmetrical manner. There is a substantial heat return or recycling of hot, exiting generator gases to the gasification air and preheating of the fuel.

It has been found that different fuels, even those with a high water content, can be gasified by the known apparatus in an environmentally safe manner. The apparatus achieves relatively high efficiency levels and solves sewage problems in connection with the tar and phenol contents. However, it has been found that there is a risk of the coal encrusting under the existing fill level sieve or screen in the primary reactor. The known apparatus is used both in the case of small and larger installations, and it has been found that instabilities occur in the primary reactor. The through-flow with air can become one-sided after a few hours' operation and can lead to channelling with subsequent slag formation. Due to the fuel grain size and the specific operating capacity levels, the generator gas in the primary stage contains too much flue coal, which blocks the secondary reactor. There is consequently a fluctuation in the pressure losses, and a large amount of coal must be discharged from the secondary reactor in the form of fine coal, which is not usable, since the secondary reactor requires reactive coke which is coarse-grain and relatively hard. Simultaneously, there are fluctuations in the coke consumption in the secondary reactor. This can lead to high costs under least favorable operating conditions.

German Patent 50 137 describes a gas generator with a combustion chamber to which fresh fuel is supplied from above. Under the fresh fuel layer, there is an ash layer on the bottom plate provided beneath the combustion chamber. The bottom plate can be rotated by means of a crank, so that the ash drops over the edge of the bottom plate into an ashpit. Air and/or steam is passed through the bottom plate into the combustion chamber.

The object of the present invention is to provide a method and an apparatus for producing generator gas and activated carbon from solid fuels, whose operating conditions are constant regardless of the apparatus size. Another object of the present invention is to make it possible to rapidly regulate the individual operating quantities. Yet another object is to provide a method and apparatus which efficiently produces a generator gas with a high purity level.

SUMMARY OF THE INVENTION

The present invention solves the problems, mentioned above, by characterizing features. In a precombustion chamber, part of the fuel is burnt for reducing the oxygen content of the gasification air. This chamber, along with the turntable or rotary bottom in the first gasification stage, provides a good distribution of the fuel in the first gasification stage. Therefore, no channels and slag can form. This applies both in the case of large and small reactors, so that the operating conditions are independent of the size of the installation. As a result of the circulating return of the flue coal in the intermediate gasification area, the flue coal residence time is greatly increased, so that the reduction process in the intermediate gasification stage is improved. The exit temperatures of the gases from the intermediate gasification area are lowered as a result of the endothermic reduction process, and simultaneously, the calorific value of the gas is increased. Activated carbon can be reduced by the regulated, circulating flue coal return.

The level measurement takes place with an axially displaceable, rotating level rotor with pitch or setting faces which is similar to a propeller. The level device sinks into the often fine-grain coal bed of the first gasification stage. This is due to the fact that the blades of the level rotor are given a lift by the rotation and the setting or pitch angle. The coal is prevented from sticking on the blades.

BRIEF DESCRIPTION OF THE DRAWINGS

The invention is described in greater detail hereinafter relative to non-limitative embodiments and the attached drawings, wherein.

DETAILED DESCRIPTION OF THE INVENTION

Figure 1:
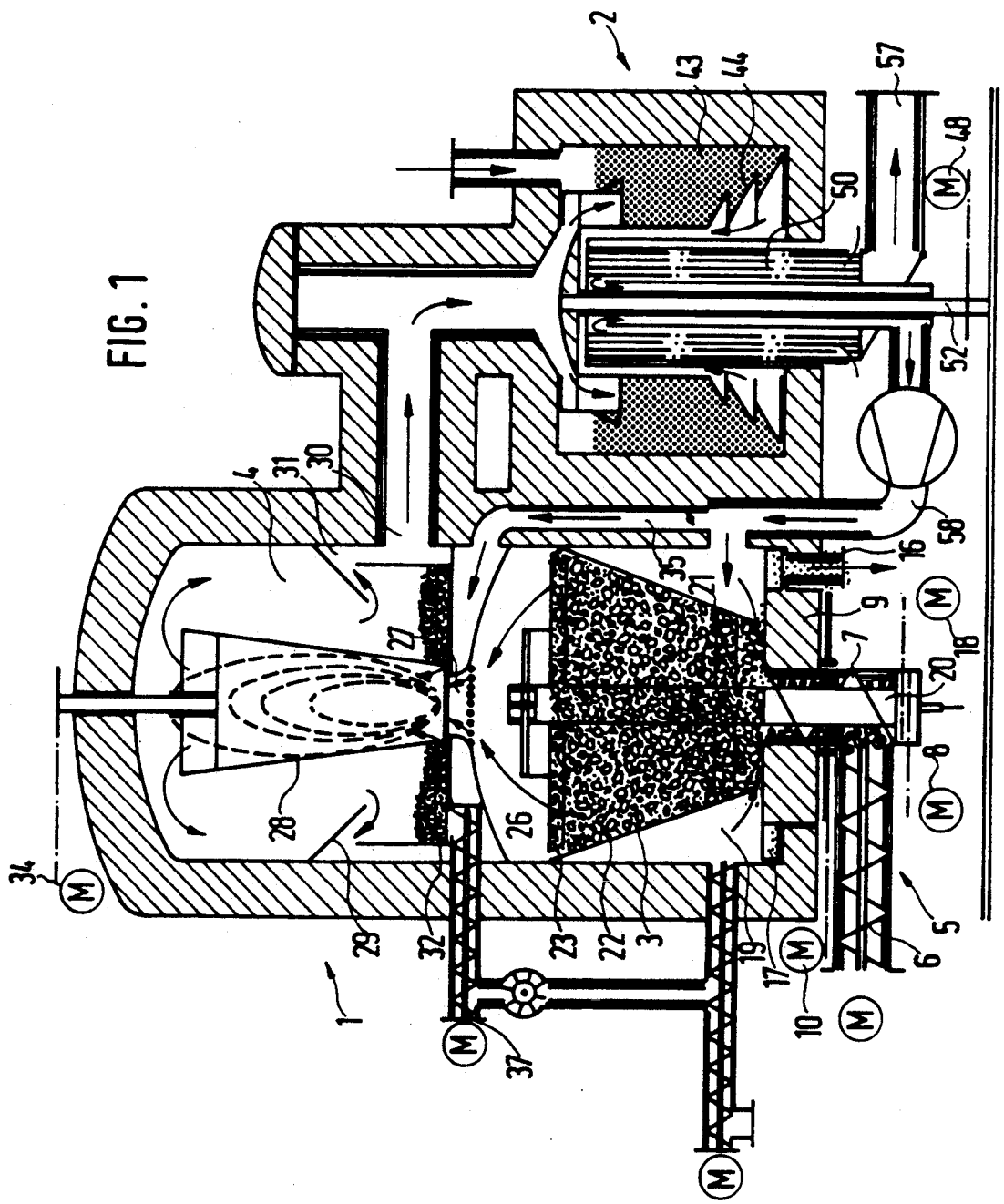
FIG. 1 is a section through an embodiment of the invention with all three gasification stages.
Figure 2:
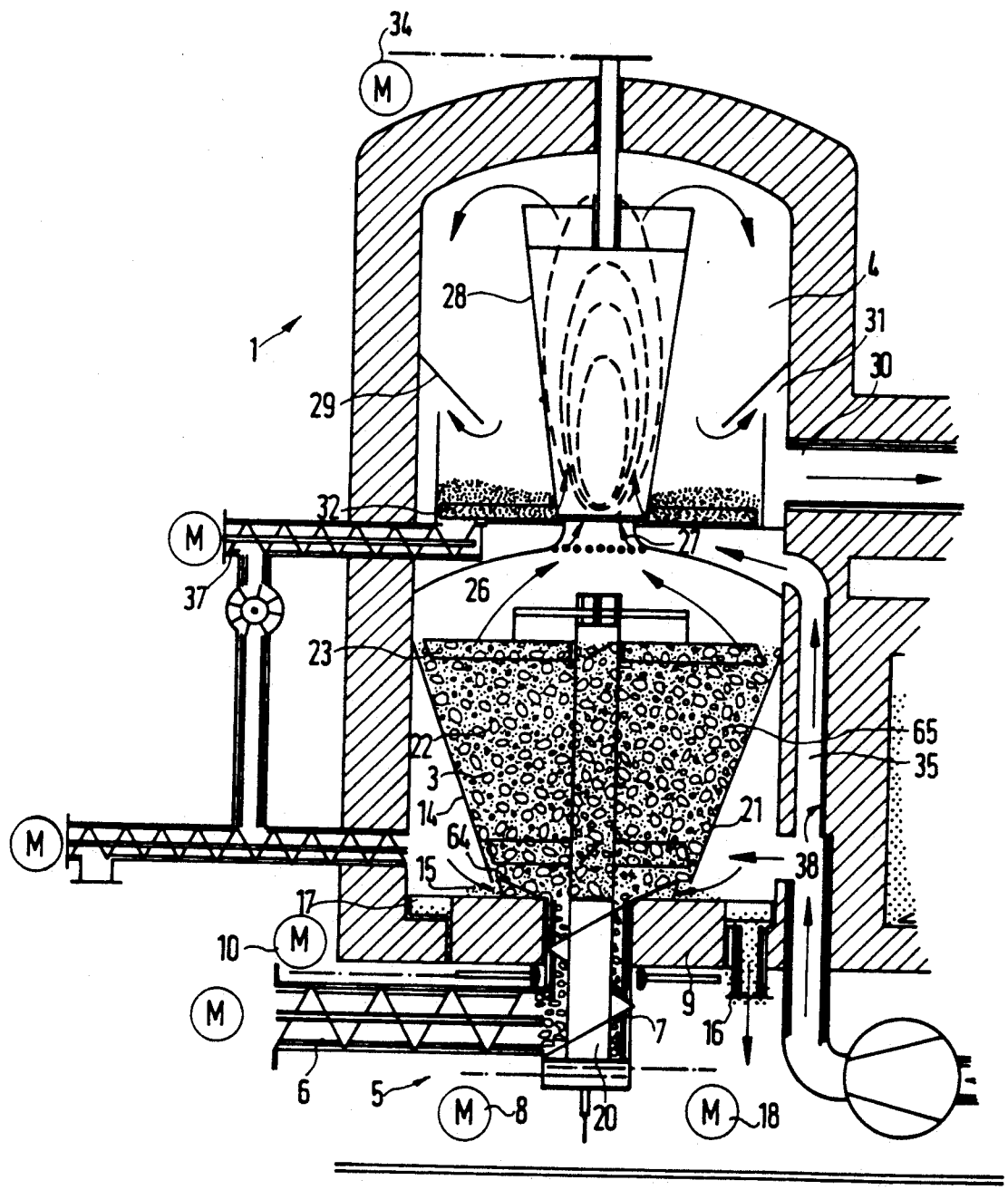
FIG. 2 is a larger scale section through the first and second gasification stages.

Shown in FIG. 1 is a first reactor 1 and a second reactor 2, which are spatially separated in the represented embodiment. The first reactor 1 is shown on a larger scale in FIG. 2. The first reactor 1 is provided with a first gasification stage 3 and a second gasification stage forming an intermediate gasification area 4. First reactor 1 also has an underfeed charging means 5, which comprises a proportioning screw 6, a vertical feed screw 7 and a speed-regulated drive 8. The bottom of the first reactor 1 is constructed as a turntable 9, which is rotated by a speed-regulated drive 10.

Figure 3:
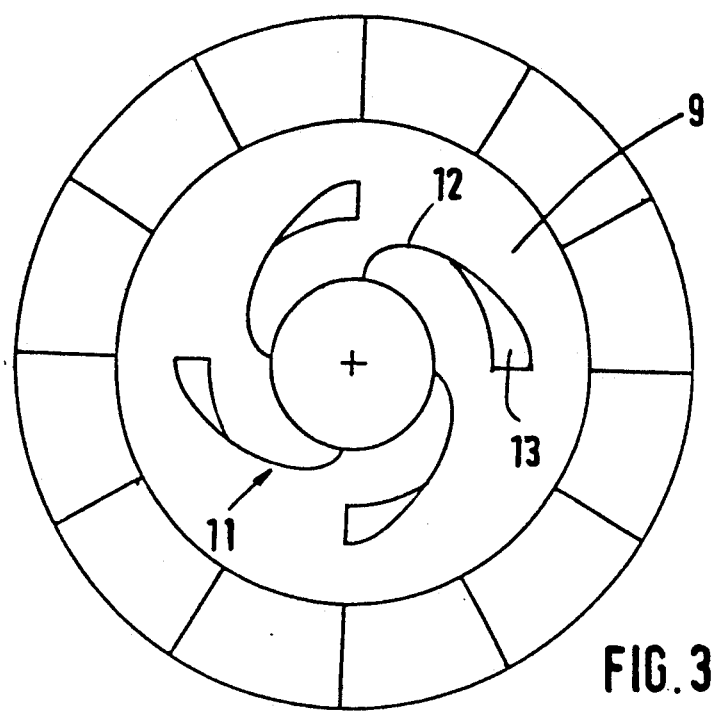
FIG. 3 is a plan view of the turntable of the first gasification stage with deflector plates for fuel distribution and rotary sectors of the precombustion chamber.

As shown in FIG. 3, guide blades 11 are arranged on the turntable 9. In the preferred embodiment, the blades 11 feed the fuel outwards and then upwards. FIG. 3 shows the turntable 9 with guide blades 11, which for feeding outwards, are constructed as spiral plates 12, and for feeding upwards are constructed as angular, radially positioned plates 13, the latter being located on the ends of the guide blades 11.

Referring back to FIG. 2, in a first gasification stage 3, the fuel is received in a funnel-shaped vessel 14, which is open at the top and bottom. An air gap 15 is provided between the turntable 9 and the lower end of vessel 14. The lower end of vessel 14 represents a connection between the interior of vessel 14 and a precombustion chamber 19. Precombustion chamber 19 is in the lower area of the first reactor 1, between its wall and the vessel 14. A precombustion of a partial fuel flow takes place in the chamber 19. In the vicinity of the bottom of the first reactor 1, rotary sectors 17 are arranged in the precombustion chamber 19 and rotate together with turntable 9 to convey the precombusted fuel to a downcomer 16. A shaft 20, rotatable by means of a drive 18, projects through the vertical feed screw 7 into the interior of the first reactor 1. Upwardly set stirring blades 21 are located on the shaft 20 within vessel 14.

A fuel bed 22 in vessel 14 is covered by a floating, axially displaceable, rotationally symmetrical fill level rotor 23. The rotor 23 scans or senses the fuel level and is connected to a control loop (not shown). To avoid encrustations and caking, the level rotor 23 is rotated and is driven by means of shaft 20. Level rotor 23 is provided with setting plates (not shown), which impart a lift to the rotor 23 as a result of the rotation, and consequently avoid sinking into the highly fluid, fine coal. The speed of level rotor 23 is regulated as a function of the fuel grain size and the gas through put the vessel 14. Therefore, either only that amount of flue coal is discharged as is brought into the intermediate gasification stage, or the amount discharged is the quantity optimum for producing activated carbon as the coupling product.

The second gasification stage 4, constructed as an intermediate gasification area, has a combustion zone 26, which is continued in a Venturi tube or nozzle 27 with a diffuser 28. Roughly at the central height of diffuser 28, a centrifugal force separator 29 is arranged on the outer wall of the second gasification stage 4. A hot gas pipe 30 leads from the area 31 shielded by the centrifugal force separator 29 into the second reactor 2.

Figure 4:
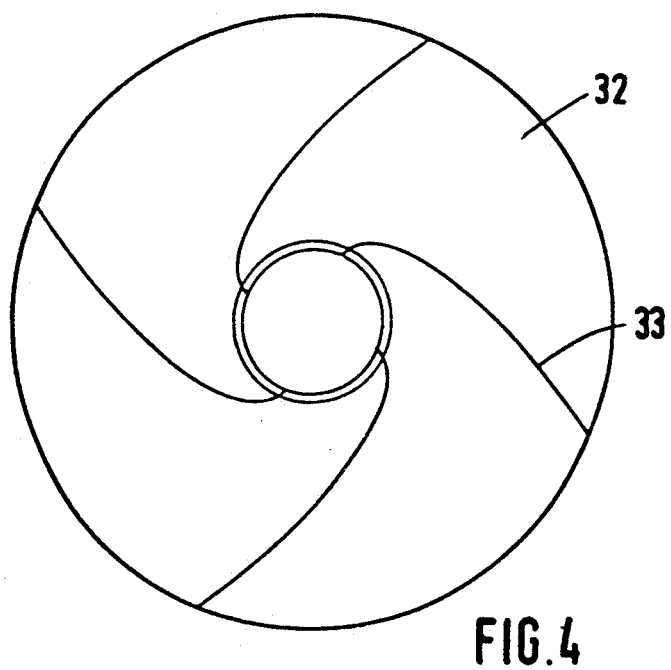
FIG. 4 is a plan view of the rotary valve of the second gasification stage with deflector plates for flue coal guidance.

The bottom of the intermediate gasification area 4, level with the throat or groove of the Venturi tube, is constructed as an externally driven rotary valve 32, which is shown in greater detail in FIG. 4. This rotary valve 32 is provided with curved deflector plates 33, so that on rotating in one direction, the flue coal is led inward to the throat of Venturi tube 27, while rotation in the opposite direction leads it outwards. A discharge screw 37 is provided below the outer marginal area of the rotary valve 32. The discharge screw 37 feeds the flue coal obtained to the outside. The rotary valve 32 is driven from above by means of a motor 34. The diffuser 28 is also rotated.

The air for the intermediate gasification area 4 is also preheated and passes via a channel 35 into the area of the combustion zone 26 and the Venturi tube 27. By means of a constrictor 38, the air quantity is regulated as a function of the temperature in the diffuser 28.

Figure 5:
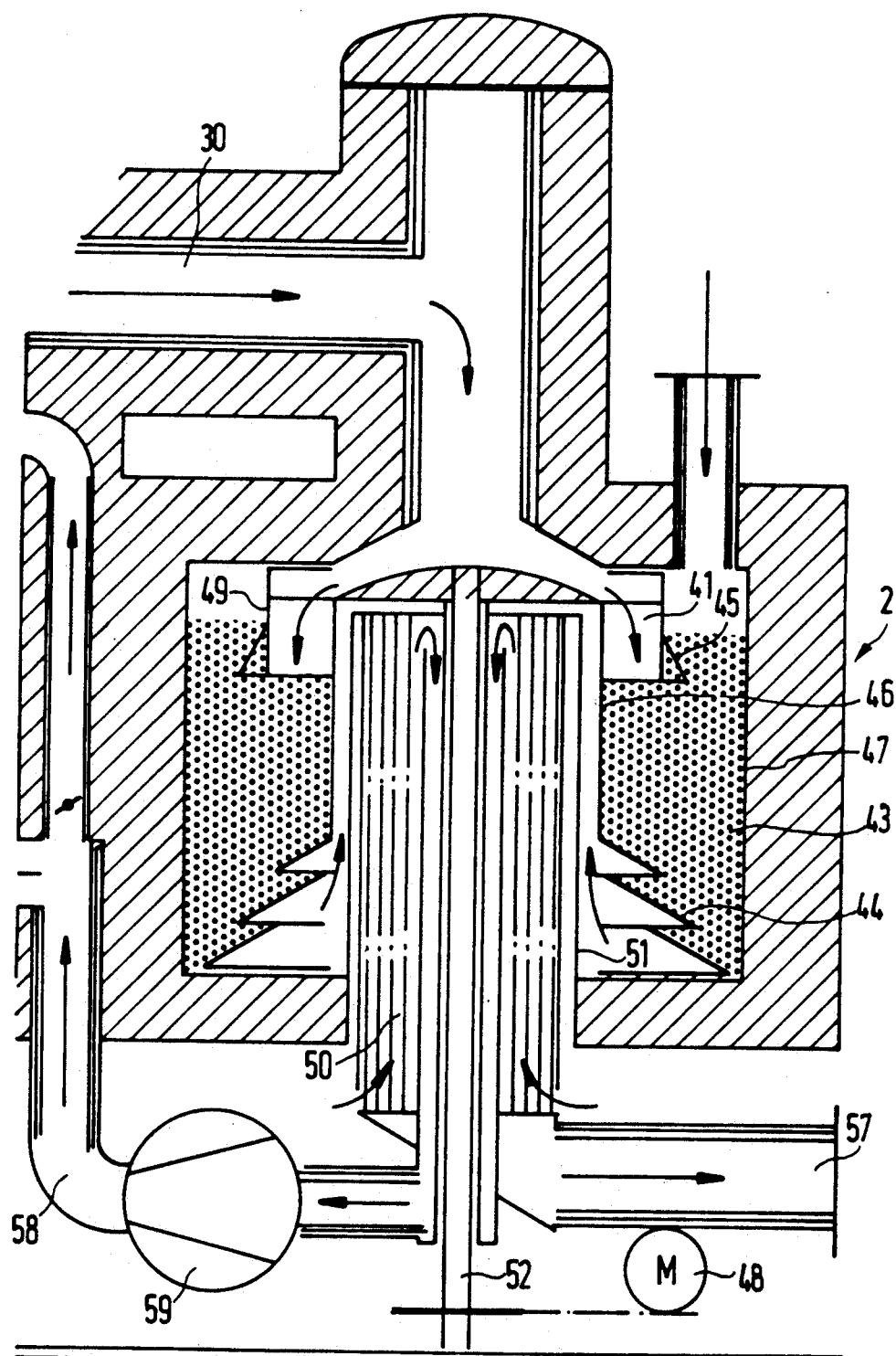
FIG. 5 is a section through the third gasification stage.

As seen in FIG. 5, the first reactor 1 is connected by means of the hot gas pipe 30 to the second reactor 2 which is the third gasification stage, is constructed as a coke gasifier, and contains a glowing coke bed 43. The coke bed 43 is positioned on a rotary, rotationally symmetrical step grate 44. The step grate 44 makes it possible to use fine coke or charcoal, because the coke cannot drop through the grate bars. The step grate 44 passes upwards into a jacket 46 with a relatively large diameter, which is approximately 30 to 50% of the diameter of the reactor wall 47. In the upper region, an annular casing or channel 41 is provided on jacket 46. Hot gas pipe 30, above coke bed 43 and step grate 44 issues centrally into annular casing 41. By means of web plates, the outer casing 49 of annular channel 41 is firmly connected to jacket 46, so that it rotates therewith. Annular casing 41 is also provided with dogs 45 for distributing the coke.

Within the jacket 46 of the step grate 44, a gas-air tubular heat exchanger 50 is arranged in fixed manner. A hot gas pipe 57 leading to the scrubber is connected to the tubular heat exchanger 50. In order to prevent clogging of the tubular heat exchanger 50, a fixed screen or sieve 51 is arranged between the heat exchanger 50 and jacket 46. A shaft 52 connected to jacket 46 passes centrally through the heat exchanger 50 and is rotated by a drive 48.

An air pipe 58 is arranged between the second reactor 2 and the first reactor 1. The air pipe 58 supplies air into the first reactor 1 for gasification purposes, by issuing into the precombustion chamber 19 and into the channel or duct 35 to the second gasification stage. The gasification air is sucked or pressed by a speed-regulated blower 59 through the heat exchanger 50 into air pipe 58, the speed being regulated in such a way that there is a zero pressure difference between the preheated gasification air in the precombustion chamber 19 and the external pressure.

The apparatus of the present invention functions in the following way. By means of the horizontal proportioning screw 6 and the vertical feed screw 7, driven synchronously with the proportioning screw 6, fuel is fed from a metering bunker and passes rotationally symmetrically into the first gasification stage 3. Fuel charging is regulated with the aid of a cascade control from: the gas through put vessel 14 and/or the fill level in the first gasification stage 3; and/or from the gas through put vessel 14; and/or the exit temperature of the gas from the first gasification stage 3; and/or the mixture calorific value of the gas in the second gasification stage 4. The control variable is the gas through put vessel 14, which is sensed with a suitable sensor, the sensor supplying an electrical signal, which controls the control loop (not shown) of level rotor 23, e.g., a potentiometer contained in the control loop. Another possibility for the control of the fuel charging involves linking the gas throughout signal with a signal indicating the temperature of the gas leaving the primary gasification area by means of a cascade PID controller (i.e., a Proportional Controller with Integrator and Differentiator). This leads to a constant fuel charging in the case of load changes.

The guide blades 11 of turntable 9 feed the fuel radially outwards and then upwards, as a function of the speed of blades 11, in the vicinity of air gap 15. This prevents channelling and slag formation in the lower first gasification stage 3 within the fuel. A small part of the fuel is passed by turntable 9 through the air gap 15 into the precombustion chamber 19, where it is burnt by the preheated air supplied by means of air pipe 58, e.g., at 500° C. into the secondary reactor 2. This precombustion chamber burning serves to reduce the oxygen content of the gasification air, preferably by 20 to 25%, and consequently prevents any slag formation in the first gasification stage 3. The speed of turntable 9 is regulated in such a way that up to about 15% and generally up to 5% of the fuel passes into the precombustion chamber 19. Turntable 9 also keeps air gap 15 symmetrically free, and ash and possibly stones are discharged into the precombustion chamber 19 and conveyed with the aid of the rotary sectors 17 to downcomer 16.

The preheated gasification air, whose oxygen content has already been reduced by the precombustion in precombustion chamber 19, passes through the air gap 15 into the fresh fuel and forms the oxidation zone 64 of the gasification. In this oxidation zone 64 with temperatures of about 850° C., most of the carbonization gases released during combustion are burnt. What remains is a charcoal or peat or lignite coke, which is forced upwards by the following fuel into the reaction zone 65, the stirring blades 21 assisting the feed action and simultaneously leveling the bed. A heated carbonaceous material, chosen from the group consisting of glowing charcoal, glowing coke, or the like, is available there for the reduction process. This gasification process, with the fuel and combustion air flowing in the same direction and accompanied by precombustion chamber burning, leads to a generator gas with tar and phenol contents well below 1% in the first gasification stage 3. The water content of the gas in the case of wood-like fuels is generally over 15%.

This gas undergoes a cracking process in the intermediate gasification area 4 in order to split off virtually all the higher molecular hydrocarbons. This cracking process is assisted by the high hydrogen contents. When the gas from the first gasification stage 3 passes into the combustion zone 26 of the intermediate gasification area 4, it is partly burnt with the air flowing through duct 35, whose quantity is regulated as a function of the temperature in diffuser 28. The cracking temperature is generally approximately 900° C., but in special cases, e.g., the gasification of special refuse or garbage, higher temperatures must be set.

Combustion first takes place in the Venturi tube 27, and the gas is adequately whirled in the series-connected diffuser 28. A vacuum is produced in the throat of the Venturi tube or nozzle 27, which permits a suction from the side. At the upper end of diffuser 28, the gas is deflected by approximately 180° and is led downward. After roughly half the intermediate gasification, a large part of the gas is again deflected outwards by 180° on the centrifugal force separator 29. The flue coal with particle sizes over 0.1 mm is separated and is sucked off by means of the gas pipe 30 and passed into the reactor 2.

The separated flue coal drops onto rotary valve 32 on the bottom of the intermediate gasification area 4 and, as a function of the rotation direction, is fed by the deflector plates 33 to the discharge screw 37, or is returned inward to the throat of Venturi tube 27, where it is subject to vacuum suction action. As a result of this separation and return of the flue coal, there is an enrichment of the flue coal from the first gasification stage 3 in the intermediate gasification area 4. The residence time of the flue coal is significantly increased, so that as a result of the concentration of the flue coal in the intermediate gasification area 4, the reduction process is greatly assisted. The exit temperatures of the gas from the intermediate gasification area 4 are reduced as a result of the endothermic reduction process, so that coke consumption in the second reactor 2 is reduced.

If the exit of the flue coal from the first gasification stage 3 is regulated in such a way that it just corresponds to the coal consumption in the intermediate gasification area 4, there is an optimum final combustion of the fuel in the first gasification stage. As a result of the regulated flue coal return into the Venturi tube 27, with regulatable residence time in the intermediate gasification area 4, it is possible to bring about a further application of the process.

This further application is the planned production of high-grade, fine-grain activated carbon resulting from a reduction of fine coal in a steam or carbon-dioxide ambient at temperatures above 800° C. To achieve this high-grade activated carbon, the discharge of flue coal from the first gasification stage 3 is increased to beyond the stoichiometric coal consumption of intermediate gasification by increasing the speed of the level rotor 23. The flue coal residence time in the intermediate gasification area 4 is then regulated by means of the discharge speed of discharge screw 37. By removing activated carbon from a temperature range of roughly 700° C., it is ensured that the coal is largely free from higher molecular weight, surface-attached hydrocarbons. In order to activate externally supplied coke or to regenerate activated carbon, they can be, for example, dosed (introduced in controlled amounts) into the intermediate gasification area.

The gas leaving the intermediate gasification area 4 is substantially free from tar, so that the washing and condensation water complies with the infeed regulations of sewage works. In principle, there would be no need for a further gasification stage if the flue coal proportion from the primary gasification was high enough. However, for safety reasons, and also in order to largely utilize the sensible heat of the gas usable for the reduction processes, a coke generator is series-connected, and its glowing coke bed prevents the passage of tars in case of operating faults.

The gas passes out of the intermediate gasification area 4 via a gas pipe 30 at temperature of 650° to 800° C., passes into the annular channel 41 of the second reactor 2, and from there flows through the glowing coke bed 43 in the same direction as the coke, which is fed in from above. The gas passing through the step grate 44 is passed through a ring channel within the jacket 46 in the upwards direction. From there, the gas passes through the pipes of the heat exchanger 50 integrated into the step grate 44 in the downward direction, and from there is passed via the hot gas pipe 57 at approximately 450° C. to the scrubber. The heat given off by the gas in the heat exchanger 50 is used for heating the gasification air for the first reactor 1, which is sucked by blower 59 into heat exchanger 50.

It is possible in the described embodiment to construct the first reactor in modular manner, i.e., the upper part of the first reactor can be removed and the parts present in the lower area of the first reactor 1 can be inserted or plugged in from above. Thus, the reactor can be rapidly re-equipped for different operating conditions, and repairs can be simplified.

Having thus described the invention, what is claimed is:

1. A reactor apparatus for producing generator gas and activated carbon from solid fuels, the apparatus comprising:
   means for achieving a first gasification, the first gasification means having means for supplying air, a bottom formed of a turntable, and an underfeed charging means, in communication with the turntable, for rotationally symmetric supplying of fuel into the bottom;
   means for achieving an intermediate gasification, the intermediate gasification means having a Venturi tube connected to a diffuser, the Venturi tube having a throat connected to and in fluid communication with the first gasification means, and rotary valve means for returning a portion of the fuel to the Venturi tube; and
   means for achieving a third gasification, the third gasification means in fluid communication with the intermediate means.

2. The apparatus according to claim 1, further comprising a first reactor containing the first gasification means and the intermediate gasification means, the intermediate means disposed above the first gasification means, and a second reactor containing the third gasification means.

3. The apparatus according to claim 1, wherein the first gasification means further comprises a vessel having a lower end and an open top and bottom, a first reactor having walls containing the vessel to define an air gap between the lower end of the vessel and the turntable.

4. The apparatus according to claim 3, further comprising the air supply means located in the first reactor near the bottom of the vessel, and a precombustion chamber, for burning a small part of the fuel supplied, located between the vessel and the reactor wall, in the vicinity of the air supply means.

5. The apparatus according to claim 3, further comprising guide blades on the turntable such that the blades pass the fuel first outwards and then upwards in the vessel contained in the first gasification means, the blades directing the fuel as a function of speed.

6. The apparatus according to claim 1, further comprising a precombustion chamber located in the first gasification means subdivided into sectors with deflector plates, such that the sectors rotate with the turntable.

7. The apparatus according to claim 1, further comprising a stirrer with stirring blades for feeding and distributing fuel within the first gasification means.

8. The apparatus according to claim 1, further comprising the first gasification means having a fuel bed and an axially displaceable level rotor arranged in a floating manner on the fuel bed, the rotor mounted in a rotary manner.

9. The apparatus according to claim 8, further comprising the level rotor having deflector plates with setting angles for producing lift during rotary movements on the fuel bed and the level rotor axially displaceable as a function of a fill level.

10. The apparatus according to claim 8, further comprising means for regulating discharge of fuel in the form of flue gas from the first gasification means as a function of rotary speed of the level rotor.

11. The apparatus according to claim 1, further comprising the rotary valve in the intermediate gasification means arranged on the bottom of the intermediate means adjacent the throat of the Venturi tube.

12. The apparatus according to claim 11, further comprising the rotary valve having rearwardly curved deflector plates to guide fuel inwards in one rotation direction, and to guide fuel outwards to a removal means in an opposite rotation direction.

13. The apparatus according to claim 1, wherein the intermediate gasification means further comprises a gas outlet, and a centrifugal force separator for separating fuel in the form of flue coal disposed upstream of the gas outlet.

14. The apparatus according to claim 1, wherein the thrid gasification means further comprises means for gas reaction having a rotary step grate for uniform distribution purposes, and a glowing coke bed resting on the rotary step grate.

15. The apparatus according to claim 14, wherein the step grate passes into a jacket with a relatively large diameter driven from the outside, and a gas-air heat exchanger in an interior of the jacket for preheating gasification air for delivery to the air supply means.

16. The apparatus according to claim 15, further comprising an annular channel in an upper region of the jacket for entry of gas from the intermediate gasification means, an outer casing of the annular channel rigidly connected by means of web plates with the step grate, and dogs fitted to the outer casing to distribute coke over the entire reactor.

* * * * *